Jan. 8, 1952     S. M. KINZINGER     2,581,908
NONDISCOLORING STABILIZED VINYL
CHLORIDE RESIN COMPOSITIONS
Filed Feb. 18, 1950
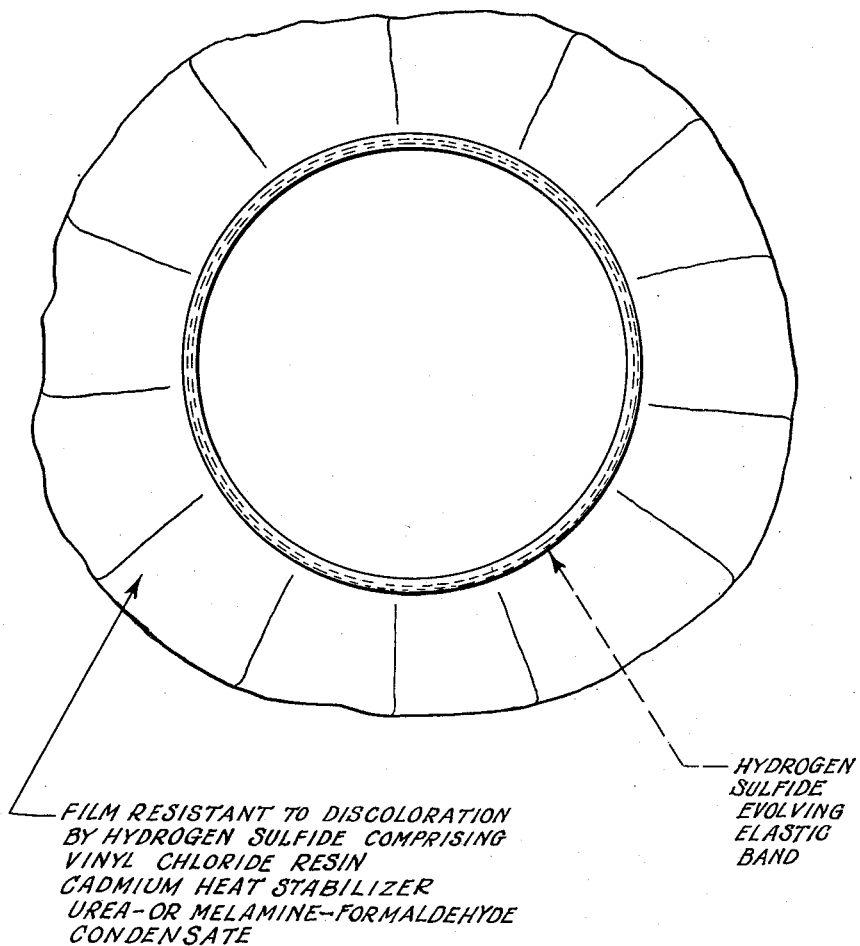
FILM RESISTANT TO DISCOLORATION
BY HYDROGEN SULFIDE COMPRISING
VINYL CHLORIDE RESIN
CADMIUM HEAT STABILIZER
UREA- OR MELAMINE-FORMALDEHYDE
CONDENSATE
HYDROGEN
SULFIDE
EVOLVING
ELASTIC
BAND
Inventor
SIEGFRIED M. KINZINGER
By Ely & Frye
Attorneys Patented Jan. 8, 1952

2,581,908

UNITED STATES PATENT OFFICE 2,581,908

NONDISCOLORING STABILIZED VINYL CHLORIDE RESIN COMPOSITIONS

Siegfried M. Kinzinger, Pottstown, Pa., assignor to The Firestone Tire & Rubber Company, Akron, Ohio, a corporation of Ohio Application February 18, 1950, Serial No. 155,697

7 Claims. (Cl. 260—45.2)

This invention relates to the prevention of discoloration, resulting from contact with hydrogen sulfide gas, of vinyl chloride resins, films, sheetings and the like containing cadmium stabilizers.

Organic compounds of cadmium are commonly added to vinyl chloride resin compositions intended for fabrication into films, artificial leather, and the like, in order to prevent the deterioration thereof under conditions of heat and friction during fabrication and also to prevent the aging of the finished article. These stabilizing compounds have the disadvantage that they cause discoloration of the finshed article when exposed to atmospheres containing hydrogen sulfide in even minute quantities. Such exposure occurs rather frequently; for instance, if a film is made up into a refrigeration dish cover or an apron having an elastic drawstring, the vulcanized rubber in the elastic drawstring gives off sufficient quantities of hydrogen sulfide to cause discoloration; similarly, if an artificial leather is employed in connection with a foamed rubber cushion, the hydrogen sulfide given off by the foamed rubber speedily causes discoloration; likewise if articles of this nature are packed in cardboard shipping boxes containing sulfur compounds derived from the pulping process, discoloration is apt to occur.

Accordingly, it is an object of this invention to provide vinyl chloride resin compositions which are not deteriorated by the heat and friction of fabrication, or by subsequent action of light and air, and which also are not discolored by exposure to hydrogen sulfide.

Another object is to provide vinyl chloride resin compositions containing organic cadmium compounds which will not be discolored by the action of hydrogen sulfide.

A further object is to secure the above objects in compositions which are inexpensive, are readily processed by existing equipment and procedures, and have mechanical properties unchanged from those of the conventional vinyl chloride resin compositions.

SYNOPSIS OF THE INVENTION

The above and other objects are secured, in accordance with this invention, by incorporating, in a vinyl chloride resin composition containing an organic cadmium compound as a stabilizer, from 0.5 to 10.0%, preferably 1 to 3%, of an aminoplast condensate or resin. Such compositions effectively resist discoloration when exposed to hydrogen sulfide, notwithstanding the presence of cadmium stabilizer therein. The presence of the aminoplast does not measurably affect the processing or mechanical properties of the compositions, which may therefore be fabricated by means of conventional techniques and apparatus into products having the same physical properties and characteristics as corresponding products heretofore manufactured from vinyl resins. Inasmuch as the problem of discoloration by hydrogen sulfide is most severe in the case of sheeted products such as films, artificial leather, etc., the invention is of particular application to vinyl chloride resins fabricated into these articles.

The accompanying drawing illustrates a conventional refrigerator dish cover made from the composition of this invention. Such a refrigerator dish cover will not show discoloration due to hydrogen sulfide gas, as explained hereinbelow in Example I.

THE AMINOPLAST CONDENSATE

The aminoplast condensates employed in this invention may be any of the well-known condensates of urea, or of melamine, with formaldehyde, varying in degree of condensation all the way from the simple preliminary adducts such as methylolurea or dimethylol urea, or the simple mono, di and tri methylol adducts of melamine, down to, but not including, the final thermoset, infusible and insoluble cured condensates. In the terminology of thermosetting resins, the aminoplast condensates employed in this invention range through the "A" and "B" stages of condensation, but do not include the "C" stage condensates, as these last are unworkable solids which could not be blended with the vinyl chloride resin compositions. In general, these condensates will contain from about 1 to about 3 moles of formaldehyde for each mole of urea or of melamine entering into the synthesis thereof. The condensates employed in this invention may also have condensed therein minor proportions (say up to 0.1 mole per mole of urea or melamine) of aliphatic alcohols. A more detailed description of the processes employed in the condensation of formaldehyde with urea and with melamine will be found in Nauth, "The Chemistry and Technology of Plastics" (Reinhold), Chapter 3, pp. 55–91, and Wakeman, "The Chemistry of Commercial Plastics" (Reinhold), Chapter 7, pp. 171–196 (on urea condensates) and Chapter 8, pp. 197–207 (on melamine condensates).

As to the amount of the aminoplast condensate to be employed, as little as 0.5%, based on the weight of vinyl chloride resin in the composition, will materially inhibit any discoloration due to the interaction of hydrogen sulfide and any cadmium stabilizers which may be present. The maximum amount which it is possible to employ is the maximum amount which is compatible with the vinyl chloride resin: in general, vinyl chloride resin compositions will tolerate at least as high as 10% of aminoplast condensate, based on the weight of vinyl chloride resin in the composition. It will be preferred, in most cases, to employ from 1% to 3%, based on the weight of vinyl chloride resin, of the urea-formaldehyde or melamine-formaldehyde condensate.

THE CADMIUM-CONTAINING ORGANIC COMPOUND STABILIZERS

It has been found that cadmium compounds containing organic groups capable of solubilizing the compounds in the vinyl chloride resins very effectively stabilize these resins against deterioration by heat and friction during fabrication and also protect the articles finally produced from the resins against aging due to light and atmospheric action. A particularly advantageous subdivision of these compounds are the cadmium alkyl mercaptides, the molecules of which contain two alkyl groups each containing from 5 to 26 carbon atoms, which alkyl groups are linked to the cadmium atom through divalent sulfur atoms. Cadmium mercaptides of this type are readily compatible with vinyl resins and enable them to be worked (milled, calendered, etc.) at unconventional and extremely high temperatures for extremely long times. For instance, they permit working at 310°-340° F. for periods of one-half to one hour; at 340°-380° F. for periods up to ten minutes; and for periods of a minute or two at 400° C., as on a high speed calender. This permits of a much better fusion of the resin than is obtained in ordinary working, resulting in films and other products of outstanding clarity, homogeneity and strength, and in much higher permissible calendering speeds. Other cadmium compounds which may be used in the practice of this invention include the fatty acid salts and soaps of cadmium such as cadmium diacetate, dibutyrate, dilaurate, dioleate, diabietate and the like. In general the fatty acid radical in these salts and soaps may contain from two to 26 carbon atoms. Likewise there may be employed mercaptides other than cadmium alkyl mercaptides, such as cadmium diphenyl mercaptide. Still further in addition there may be employed organometallic compounds involving cadmium such as dilauryl cadmium and the like. In general, these are compounds in which one or both of the valences of the cadmium atom are occupied by alkyl groups containing from one to 26 carbon atoms, any remaining valence being satisfied by a fatty acid radical containing from 1 to 26 carbon atoms or by a weak inorganic acid radical such as phosphate, borate, silicate, or the like. These cadmium stabilizers will be present in the compositions of this invention to the extent of from 0.5 to 5.0%, based on the weight of vinyl chloride resin.

THE VINYL CHLORIDE RESINS

The vinyl chloride resins are a well-known class of materials consisting of simple polymers of vinyl chloride, and copolymers of vinyl chloride in which the essential polyvinyl chloride polymer chains are interspersed at intervals with the residues of other monoethylenically unsaturated compounds or conjugated diethylenically unsaturated compounds. In general, the essential character of the vinyl chloride polymer is unchanged, aside from a certain desirable increase in processibility and flexibility, by the inclusion therein of up to 20%, based on the total weight of the copolymer, of these extraneous unsaturated compounds. Suitable compounds for copolymerization with vinyl chloride include, for instance, vinyl esters on the order of vinyl bromide, vinyl fluoride, vinyl acetate, vinyl chloroacetate, vinyl butyrate, other fatty acid vinyl esters, vinyl alkyl sulfonates and the like; vinyl ethers such as vinyl ethyl ether, vinyl isopropyl ether, vinyl chloroethyl ether and the like; cyclic unsaturated compounds such as styrene, the mono- and polychloro-styrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate, and the like; vinylidene compounds on the order of vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like. For a fairly complete list of materials known to polymerize with vinyl chloride, reference may be had to Krczil, "Kurzes Handbuch der Polymerisations—Technik—II Mehrstoff Polymerization," Edward Bros. Inc., 1945, pp. 735-747, the items under "Vinyl chlorid." As a rough rule, the criterion of a practical comonomer for use with vinyl chloride to produce copolymers containing from 20% or more of vinyl chloride is that, on a mole percentage basis, an initial charge of 96% vinyl chloride, balance comonomer, shall yield an initial copolymer containing (a) at least 90% vinyl chloride, and (b) not more than 99% vinyl chloride. On this basis, satisfactory comonomers for use with vinyl chloride will be those having "$Q_2$" and "$e_2$" values, as described in J. Polymer Science 2:101, correlated as follows, assuming for vinyl chloride $Q_{vinyl\ chloride}=.03$ and $e_{vinyl\ chloride}=.3$:

$$4.1 > \frac{.029e^{-.3(.3-e_2)}}{1.33Q_2 e^{e_2(.3-e_2)} + .96} + .04 > .37$$

Instead of the single unsaturated comonomers of the types above indicated, mixtures of such comonomers may enter into the copolymers, it being understood that the total quantity thereof shall be small enough (i. e., not over 20%, based on the weight of copolymer) that the essential character of the polyvinyl chloride chain is retained.

PROPERTIES AND USES OF THE COMPOSITIONS OF THIS INVENTION

Hydrogen sulfide gas concentrations sufficient to produce discoloration of ordinary vinyl chloride resin compositions containing cadmium stabilizers are of rather common occurrence, and hence the compositions of this invention may advantageously be used for the manufacture of any articles commonly manufactured from vinyl chloride resins. For instance, the many paperboard container stocks retain unstable sulfur compounds from the pulping process which decompose to yield sufficient quantities of hydrogen sulfide to discolor any articles of cadmium-containing vinyl chloride resin which may be inclosed therein. Likewise, the atmosphere in many industrial communities contains sufficient hydrogen sulfide to cause such discoloration. A common type of exposure, and one which is almost certain to cause discoloration, occurs where sulfur-vulcanized natural and synthetic rubber elastic bands or other rubber elements are incorporated into articles made from vinyl chloride film, e. g., in refrigerator dish covers, aprons and rain garments with elastic drawstrings. Accordingly, the compositions of this invention are particularly adapted for the manufacture of films for such applications. By the term "film" is meant a thin, flexible, pellicle having a thickness of from .0005 to .005 inch.

With the foregoing discussion in mind, there are given herewith detailed examples of the practice of this invention. All parts given are by weight.

Example I

|  | Parts |
|---|---|
| "Geon 101" (a polyvinyl chloride manufactured by the B. F. Goodrich Co.) | 32 |
| "Geon 202" (a copolymer of approximately 94% vinyl chloride, 6% vinylidene chloride manufactured by the B. F. Goodrich Co.) | 16 |
| "Plasticiser SC" (a diester of triethylene glycol with mixed saturated aliphatic monobasic acids containing from 6 to 8 carbon atoms) | 15 |
| Calcium stearate | 0.3 |
| Cadmium dilauryl mercaptide | 0.75 |
| Urea-formaldehyde or melamine formaldehyde condensate (per Table I) | Per Table I |

TABLE I

| Condensate used: | Amount, parts |
|---|---|
| Melamine-formaldehyde resin (B-stage) | 1.3 |
| Alkylated urea formaldehyde Resin (B-stage) | 3.2 |
| Urea-formaldehyde resin (B-stage), different trials | .8 / 2.0 / 3.2 |
| Monomethylolurea | 2.0 |
| Dimethylolurea | 2.0 |

Example II.—Rubber band contact test

A series of films was made up using the same basic formulation (resin, plasticiser, calcium stearate, calcium mercaptide) as in Example I, with various proportions of various urea- and melamine-formaldehyde condensates as set out hereinafter in Table II. In each case, the ingredients, together with the selected condensate, were compounded in a Banbury mill at 320° F., and then calendered out at the same temperature into a film .004 inch thick. The resultant films were then wrapped upon cylindrical mandrels, and elastic rubber bands were wrapped therearound. The assemblies were placed in an oven maintained at 40° C. and 95% relative humidity.

Set forth herewith in Table II are the types and amounts of urea- and melamine-formaldehyde condensates employed in the several films, together with the extent of discoloration of the portions of the films contacting the rubber bands at the intervals of time noted.

TABLE II

| Stabilizer | Amount Used, parts | Discoloration After Exposure For— | | | |
|---|---|---|---|---|---|
|  |  | 1 day | 2 days | 4 days | 1 week |
| None | 0 | yellow | deep yellow | deep yellow | deep yellow. |
| Beetle 210-8 (Manufactured by the American Cyanamide and Chemical Corp.; an alkylated urea-formaldehyde B-stage condensate) | 1.3 | none | none | none | none. |
| Dimethylol urea | .6 | do | do | faint yellow | faint yellow. |
| Dimethylol urea | 1.3 | do | do | none | none. |
| Beetle 7278 (Manufactured by the American Cyanamide and Chemical Corp.; an alkylated urea-formaldehyde condensate (B-stage condensate)) | 1.3 | do | do | do | faint yellow. |
| Melmac 7273 (Manufactured by the American Cyanamide and Chemical Corp.; a melamine-formaldehyde B-stage condensate) | 1.3 | do | do | do | none. |
| B-stage urea-formaldehyde condensate | 1.3 | do | do | faint yellow | faint yellow. |

A series of compositions was made up in accordance with the above recipe, using various formaldehyde-urea and -melamine condensates in the several compositions in respective amounts as indicated in Table I. In each case the materials were milled together on a roll mill at 300° F. until a homogenous blend was obtained, after which the blend was transferred to a calender maintained at 320° F. and sheeted out thereon to form films .004 inch thick. The presence of the cadmium mercaptide stabilizer permitted the working at unconventionally high temperatures as described above, which resulted in exceptionally thorough fusing of the resin and consequent improved clarity and tensile strength of the product film.

A sample of each film was exposed for 1 hour in an atmosphere saturated with water vapor and containing 0.26% by volume of hydrogen sulfide gas. Each of the samples containing a condensation product remained perfectly clear at the end of the test. A film prepared by the same procedure from the ingredients of the above schedule, but omitting the condensation product, was badly yellowed at the end of the test.

The foregoing accelerated test was found to correlate well with actual service, and refrigerator bowl covers fabricated from those of the above films containing condensates with elastic rubber drawstrings withstood long periods of service without discoloration.

Example III.—Artificial leather

|  | Parts |
|---|---|
| Vinyl chloride-vinylidene chloride copolymer ("Geon 202," manufactured by the B. F. Goodrich Co., a copolymer of 94% vinyl chlorides, 6% vinylidene chloride) | 100 |
| Di(2-ethyl hexyl) phthalate | 39 |
| Kaolin | 20 |
| Titanium dioxide pigment | 5 |
| Calcium stearate | 1 |
| Cadmium dilauryl mercaptide | 2 |
| Melmac 7273 (a melamine-formaldehyde condensate manufactured by the American Cyanamide and Chemical Corp.) | 0 or 2 |

Two artificial leathers were made up in accordance with the foregoing schedule, one with and one without the melamine-formaldehyde condensate. In each case the ingredients were compounded in a banbury mill at 300° F., and calendered out at this temperature to form an artificial leather 0.04 inch thick. Samples of the leathers so produced were subjected to the rubber band contact test of Example II. The sample not containing the melamine-formaldehyde condensate yellowed badly in one day; the sample containing the melamine-formaldehyde condensate did not show any yellowing within a week, at which time the test was discontinued.

Foam-rubber-upholstered chairs covered by the artificial leather prepared as above described and containing the condensate withstood extended periods of service without discoloration of the leather.

From the foregoing general discussion and detailed specific examples, it will be evident that this invention makes possible the use, in vinyl chloride resin films and artificial leathers, of the highly effective cadmium stabilizers, without the sensitivity to discoloration by hydrogen sulfide usually attendant upon the use of these stabilizers. The urea- and melamine-formaldehyde condensates employed in the practice of this invention are readily compatible with the vinyl chloride resin compounds and, when employed in the relatively small amounts required for the effective practice of this invention, do not measurably affect the general chemical or physical properties of the compositions.

What is claimed is:

1. A composition stable to heat and light and resistant to discoloration by contact with hydrogen sulfide comprising (1) a resin selected from the group consisting of polymers of vinyl chloride and copolymers thereof with other unsaturated compounds copolymerizable therewith and containing at least 80% of vinyl chloride copolymerized therein (2) a cadmium mercaptide and (3) a condensate selected from the group consisting of urea-formaldehyde and melamine-formaldehyde condensates.

2. A composition stable to heat and light and resistant to discoloration by contact with hydrogen sulfide comprising (1) a resin selected from the group consisting of polymers of vinyl chloride and copolymers thereof with other unsaturated compounds copolymerizable therewith and containing at least 80% of vinyl chloride copolymerized therein (2) an organic cadmium compound heat and light stabilizer and (3) a urea-formaldehyde condensate.

3. A composition stable to heat and light and resistant to discoloration by contact with hydrogen sulfide comprising (1) a resin selected from the group consisting of polymers of vinyl chloride and copolymers thereof with other unsaturated compounds copolymerizable therewith and containing at least 80% of vinyl chloride copolymerized therein (2) a cadmium mercaptide and (3) a urea-formaldehyde condensate.

4. A composition stable to heat and light and resistant to discoloration by contact with hydrogen sulfide comprising (1) a resin selected from the group consisting of polymers of vinyl chloride and copolymers thereof with other unsaturated compounds copolymerizable therewith and containing at least 80% of vinyl chloride copolymerized therewith (2) an organic cadmium compound heat and light stabilizer and (3) a melamine-formaldehyde condensate.

5. A composition stable to heat and light and resistant to discoloration by contact with hydrogen sulfide comprising (1) a resin selected from the group consisting of polymers of vinyl chloride and copolymers thereof and containing at least 80% of vinyl chloride copolymerizable therein (2) a cadmium mercaptide and (3) a melamine-formaldehyde condensate.

6. A thin, flexible, self-supporting film stable to heat and light and resistant to discoloration by contact with hydrogen sulfide comprising (1) a resin selected from the group consisting of polymers of vinyl chloride and copolymers thereof with other unsaturated compounds copolymerizable therewith and containing at least 80% of vinyl chloride copolymerized therein (2) a cadmium mercaptide and (3) a urea-formaldehyde condensate.

7. A thin, flexible, self-supporting film stable to heat and light and resistant to discoloration by contact with hydrogen sulfide comprising (1) a resin selected from the group consisting of polymers of vinyl chloride and copolymers thereof with other unsaturated compounds copolymerizable therewith and containing at least 80% of vinyl chloride copolymerized therein (2) a cadmium mercaptide and (3) a melamine-formaldehyde condensate.

SIEGFRIED M. KINZINGER.

REFERENCES CITED

The following references are of record in the file of this patent:

UNITED STATES PATENTS

| Number | Name | Date |
| --- | --- | --- |
| 2,310,449 | Lightbown et al. | Feb. 9, 1943 |
| 2,364,172 | Stauffer | Dec. 5, 1944 |